United States Patent [19]

Hayden

[11] Patent Number: 4,762,338
[45] Date of Patent: Aug. 9, 1988

[54] BELT CLAMPING GUIDE LOOP

[75] Inventor: Richard A. Hayden, Troy, Mich.

[73] Assignee: General Motors Corporation, Detroit, Mich.

[21] Appl. No.: 105,669

[22] Filed: Oct. 7, 1987

[51] Int. Cl.$^4$ .............. A62B 35/02; B60R 21/10
[52] U.S. Cl. .................... 280/801; 24/196; 280/808; 297/479; 297/483
[58] Field of Search .......... 280/801, 807, 808; 297/478, 479, 483; 242/107.12, 107.2; 24/136 R

[56] References Cited

U.S. PATENT DOCUMENTS

| | | | |
|---|---|---|---|
| 3,664,598 | 5/1972 | Sherman | 242/107.3 |
| 3,847,434 | 11/1974 | Weman | 297/478 |
| 3,886,374 | 5/1975 | Lefeuvre | 111/7.4 |
| 3,898,715 | 8/1975 | Balder | 24/196 |
| 3,924,875 | 12/1975 | Lefeuvre | 280/150 |
| 4,009,510 | 3/1977 | Lindblad | 297/479 |
| 4,116,402 | 9/1978 | Nomura | 280/806 |
| 4,136,422 | 1/1979 | Ivanov | 280/801 |
| 4,163,530 | 8/1979 | Kondo | 280/808 |
| 4,208,770 | 6/1980 | Takada | 24/136 |
| 4,306,735 | 12/1981 | Pfeiffer et al. | 280/807 |
| 4,310,175 | 1/1982 | Pickett | 280/801 |
| 4,310,176 | 1/1982 | Furusawa et al. | 280/801 |
| 4,341,359 | 7/1982 | Jahn | 242/107 |
| 4,371,127 | 2/1983 | Shimogawa et al. | 242/107 |
| 4,438,551 | 3/1984 | Imai | 24/68 |
| 4,491,343 | 1/1985 | Fohl | 280/801 |
| 4,549,769 | 10/1985 | Pilarski | 297/483 |
| 4,549,770 | 10/1985 | Kurtti | 297/479 |

FOREIGN PATENT DOCUMENTS 52-13221  2/1977  Japan .

Primary Examiner—Richard A. Bertsch
Attorney, Agent, or Firm—Charles E. Leahy

[57] ABSTRACT

A restraint belt guide loop assembly for deflecting a belt from a retractor to a diagonal position across the occupant upper torso includes a mounting frame pivotally mounted on the vehicle body with the belt passing between upper and lower belt clamping shoes movably mounted on the frame so that downward acting tension on the belt urges the lower shoe downwardly. A pair of C-shaped levers are mounted on the bracket adjacent the ends of the shoes. Each lever includes an upper arm bearing on the upper shoe and a lower arm supporting the lower shoe so that downward movement of the lower shoe by the tension on the belt pivots the lever and forces the upper shoe downwardly toward the lower shoe. The upper arm is longer than the lower arm so that the pivoting movement of the lever causes the downward movement on the upper shoe to be greater than the downward movement of the lower shoe so that the upper shoe overtakes the lower shoe and clamps the belt between the shoes against sliding movement through the frame.

5 Claims, 1 Drawing Sheet

BELT CLAMPING GUIDE LOOP

The invention relates to a guide loop assembly for a motor vehicle occupant restraint system and more particularly provides a clamping mechanism which clamps the belt against sliding movement through the loop assembly in response to imposition of an occupant restraint load on the belt.

BACKGROUND OF THE INVENTION

It is well known in motor vehicle seat belt systems to pivotally mount a guide loop on the pillar to deflect the belt from a seat belt retractor mounted on the floor to a diagonal position across the occupant upper torso. These seat belt retractors typically include a locking mechanism which locks the belt against unwinding from the retractor in response to the onset of a sensed vehicle deceleration condition.

It is also known in prior art to provide a clamping mechanism which is associated with the guide loop assembly and functions to clamp the belt against sliding movement through the guide loop in consequence of imposition of an occupant restraint load on the belt. Examples of such belt clamping guide loops include Weman U.S. Pat. Nos. 3,847,434 issued Nov. 12, 1974; Balder 3,898,715 issued Aug. 12, 1975; Lindblad 4,009,510 issued Mar. 1, 1977; Jahn 4,341,359 issued July 27, 1982; Lefeuvre 3,886,374 issued May 27, 1975; Lefeuvre 3,924,875 issued Dec. 9, 1975; Takada 4,208,770 issued June 24, 1980; Mauron 3,911,535 issued Oct. 14, 1975; Pickett 4,310,175 issued Jan. 12, 1982; Shimogawa et al 4,371,127 issued Feb. 1, 1983 and Furusawa et al 4,310,176 issued Jan. 12, 1982.

The present invention provides a new and improved clamping guide loop assembly.

SUMMARY OF THE INVENTION

According to the invention, a restraint belt guide loop assembly for deflecting a belt from a retractor to a diagonal position across the occupant upper torso includes a mounting frame pivotally mounted on the vehicle body with the belt passing between upper and lower belt clamping shoes movably mounted on the frame so that downward acting tension on the belt urges the lower shoe downwardly. A pair of C-shaped levers are mounted on the bracket adjacent the ends of the shoes. Each lever includes an upper arm bearing on the upper shoe and a lower arm supporting the lower shoe so that downward movement of the lower shoe by the tension on the belt pivots the lever and forces the upper shoe downwardly toward the lower shoe. The upper arm is longer than the lower arm so that the pivoting movement of the lever causes the downward movement on the upper shoe to be greater than the downward movement of the lower shoe so that the upper shoe overtakes the lower shoe and clamps the belt between the shoes against sliding movement through the frame. A spring acts to urge the upper shoe to a normal position spaced away from the lower shoe to permit free sliding passage of the belt through the guide loop assembly.

Accordingly the object, feature and advantage of the invention resides in the provision of a guide loop having vertically movable upper and lower belt clamping shoes with a lever acting therebetween such that downward movement of the lower shoe by the belt tension actuates the lever and causes the upper shoe to overtake the lower shoe and clamp the belt between the shoes.

A further object, feature and advantage of the invention resides in the provision of C-shaped levers straddling the edges of a belt passing between upper and lower shoes mounted on a guide loop, with the upper arms of the C-shaped levers being longer than the lower arms whereby the belt tension urging downward movement of the lower shoe pivots the levers and urges the upper shoe downwardly into belt clamping proximity with the lower shoe.

BRIEF DESCRIPTION OF THE DRAWINGS

These and other features, objects and advantages of the invention will become apparent upon consideration of the specification and the appended drawings in which.

DESCRIPTION OF THE PREFERRED EMBODIMENT

Figure 1:
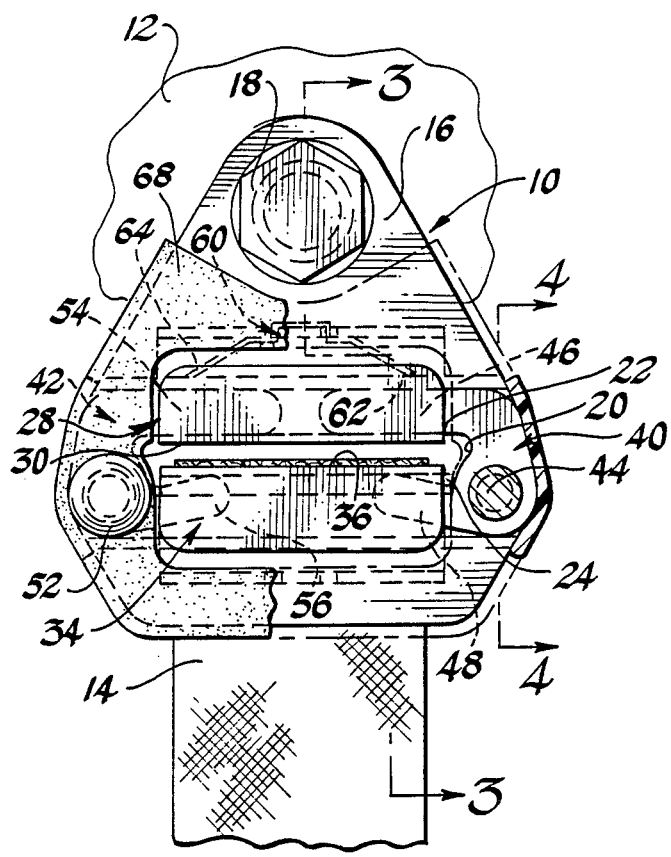
FIG. 1 is a frontal elevation view of the belt clamping guide loop assembly of this invention.
Figure 3:
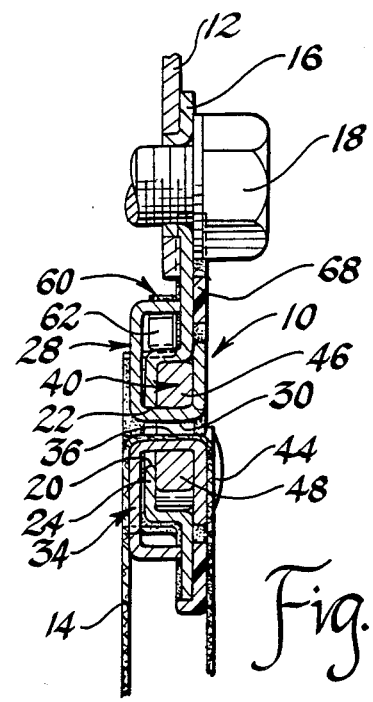
FIG. 3 is a sectional view taken in the direction of arrows 3—3 of FIG. 1.

Referring to FIGS. 1 and 3 there is shown a belt clamping guide loop assembly generally indicated at 10 which is mounted on a vehicle body pillar 12 and slidably receives a restraint belt 14.

The guide loop assembly 10 includes a guide loop frame 16 which is mounted on the pillar 12 by an anchor bolt 18 which permits the frame 16 to pivot on the pillar 12. The frame 16 hangs downwardly from the bolt 18 and has a laterally offset center portion having a rectangular opening 20 defined by a top wall 22 and a bottom wall 24. An upper belt clamping shoe 28 is mounted on the frame 16 and includes a downwardly facing belt clamping surface 30. As best seen in FIG. 3, the upper shoe is configured to fit on the frame 16 in a manner by which the upper shoe slides vertically up and down. A lower belt clamping shoe 34 is also slidably mounted on the frame 16 and includes an upwardly facing belt clamping surface 36. As best seen in FIG. 3, the upper shoe 28 and the lower shoe 34 are spaced apart somewhat to permit free sliding passage of the restraint belt 14 between the upper and lower shoes.

Figure 4:
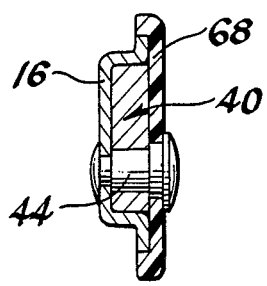
FIG. 4 is a sectional view taken in the direction of arrows 4—4 of FIG. 1.

A pair of levers 40 and 42 interconnect the upper shoe 28 and the lower shoe 34 and straddle the edges of the belt 14. As best seen in FIGS. 1, 3 and 4, the lever 40 is generally C-shaped and is pivoted to the frame 16 by a rivet 44. The lever 40 includes an upper arm 46 and a lower arm 48. The upper arm 46 overlies and engages with the upper shoe 28 at a point directly above the belt clamping surface 30. The lower arm 48 underlies and supports the lower shoe 34 at a point directly beneath the belt clamping surface 36.

The lever 42, like the lever 40, is pivotally mounted on the frame 16 by a rivet 52 and includes an upper arm 54 which overlies the upper shoe 28 and a lower arm 56 which supports the lower shoe 34.

As best seen in FIGS. 1 and 3, a leaf spring 60 is mounted on the upper shoe 28 and includes a pair of leaves 62 and 64 which bear upon the laterally offset portion of the frame 16 and cooperate to urge the upper shoe 28 vertically upward so that the upper shoe 28 engages and rests upon the upper wall 22 of the rectangular frame opening 20. The C-shaped levers 40 and 42 are thus pivoted to their upper positions of FIGS. 1 and 3 so that the lower arms 48 and 56 support the lower shoe 34 at its elevated position of FIGS. 1 and 3 spaced above the lower wall 24 of the frame opening 20.

Referring to FIGS. 1 and 3, it is appreciated that the upper shoe 28 and lower shoe 34 are spaced away from each other by more than the thickness of the restraint belt 14 so that the restraint belt 14 is permitted to slide freely between the upper and lower shoes.

When an occupant restraint load is imposed on the restraint belt 14, the occupant restraint load urges the lower shoe 34 downwardly. This downward movement of the lower shoe 34, which rests upon the lower arms 48 and 56, pivot the levers 40 and 42 downwardly. The upper arms 46 and 54 of the levers 40 and 42 overlying the upper shoe 28 act to move the upper shoe 28 downwardly against the bias of the leaf spring 60.

Figure 2:
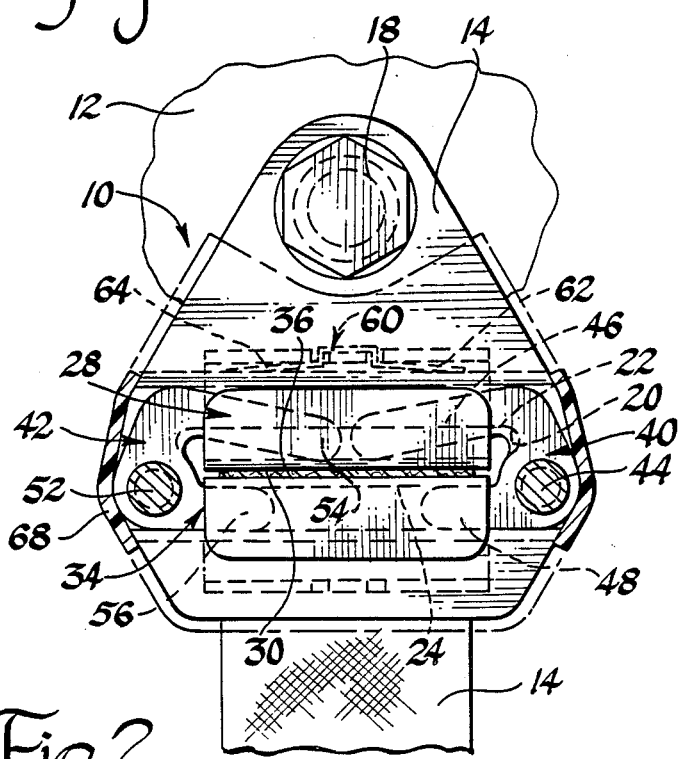
FIG. 2 is a view similar to FIG. 1 but showing the belt clamping guide loop actuated to clamp the belt between upper and lower shoes.

As best seen in FIG. 2, the upper arms 46 and 54 are longer than the lower arms 48 and 56. Accordingly, an increment of downward movement of the lower arms 48 and 56 by the lower shoe 34 will result in a larger increment of downward movement of the upper shoe 28 by the upper arms 46 and 52. Thus, as the downward of the lower shoe 34 progresses, the greater increment of downward movement of the upper shoe 28 will result in the upper shoe 28 overtaking and moving closer and closer to the lower shoe 34 so that the restraint belt 14 becomes clamped between the upper and lower shoes as shown in FIG. 2. This clamping action on the belt 14 increases progressively in proportion to the tension on the restraint belt 14.

Thus it is seen that the invention provides a new and improved self energizing belt clamp for a guide loop assembly.

As seen in the drawings, a molded plastic cover 68 is mounted on the guide loop assembly by the rivets 44 and 50 and conceals the inner workings of the guide loop assembly 10 from the view of the vehicle occupant.

Figure 5:
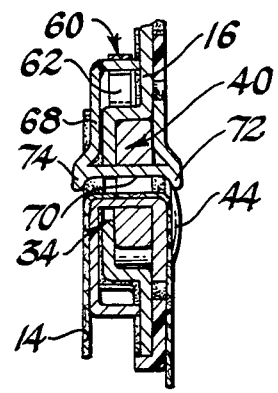
FIG. 5 is a sectional view similar to FIG. 3 but showing a modified cross sectional shape of the upper belt clamping shoe.

FIG. 5 discloses a second embodiment of the invention in which the like elements, including the frame 16, lower shoe 34, lever 40, rivet 44 and spring 60, are all designated by the same reference numeral as the corresponding elements of the FIG. 3. In the FIG. 5 embodiment, the upper shoe 69 includes an alternate cross section in which the belt clamping surface 70, facing downwardly toward the lower shoe 34 has a pair of clamping flanges 72 and 74 integral therewith which modify the clamping of the belt clamping assembly.

Thus it is seen that the invention provides a new novel and useful belt clamping guide loop assembly for a motor vehicle seat belt system.

It will be understood that the invention is not limited to the particular embodiments shown in the drawings, but rather it is defined by the following claims.

The embodiments of the invention in which an exclusive property or privilege is claimed are defined as follows:

1. A restraint belt guide loop assembly adapted to be mounted on the pillar of a vehicle body and slidably receive the belt from a retractor and deflect the belt diagonally across the occupant shoulder comprising:
   a frame mounted on the pillar;
   first and second belt clamping shoes movably mounted on the frame, the lower shoe underlying the belt so that downward acting tension on the belt urges the lower shoe downwardly, and the upper shoe overlying the belt;
   means acting between the upper shoe and the lower shoe and forcing the upper shoe downwardly toward the lower shoe at a rate of downward movement greater than the downward movement of the lower shoe in response to the belt tension so that the belt becomes clamped between the shoes and against sliding movement through the frame.

2. A restraint belt guide loop assembly adapted to be mounted on the pillar of a vehicle body and slidably receive the belt from a retractor and deflect the belt diagonally across the occupant shoulder comprising:
   a frame mounted on the pillar;
   first and second belt clamping shoes slidably mounted on the frame, the lower shoe underlying the belt so that downward acting tension on the belt urges the shoe downwardly, and the upper shoe overlying the belt;
   spring means urging the shoes apart to permit belt passage therethrough; and
   lever means pivoted on the frame and acting between the upper shoe and the lower shoe, said lever being forcibly pivoted downwardly by the lower shoe and forcing the upper shoe downwardly toward the lower shoe at a rate of downward movement greater than the downward movement of the lower shoe so that the belt becomes clamped between the shoes and against sliding movement through the frame.

3. A restraint belt guide loop assembly adapted to be mounted on the pillar of a vehicle body and slidably receive the belt from a retractor and deflect the belt diagonally across the occupant shoulder comprising:
   a frame mounted on the pillar and having a belt passage therethrough;
   first and second belt clamping shoes slidably mounted within the belt passage of the frame, the lower shoe underlying the belt so that downward acting tension on the belt urges the shoe downwardly, and the upper shoe overlying the belt;
   lever means pivoted on the frame and acting between the upper shoe and the lower shoe, said lever being C-shaped and including an upper arm bearing on the upper shoe and a lower arm supporting the lower shoe so that downward movement of the lower shoe by the tension on the belt pivots the lever and forces the upper shoe downwardly toward the lower shoe at a rate of downward movement greater than the downward movement of the lower shoe so that the belt becomes clamped between the shoes and against sliding movement through the frame.

4. A restraint belt guide loop assembly adapted to be mounted on the pillar of a vehicle body and slidably receive the belt from a retractor and deflect the belt diagonally across the occupant shoulder comprising:
   a frame mounted on the pillar and having a belt passage therethrough;
   first and second belt clamping shoes slidably mounted within the belt passage of the frame, the lower shoe underlying the belt so that downward acting tension on the belt urges the shoe downwardly, and the upper shoe overlying the belt in spaced relation from the lower shoe permitting the belt to slide therethrough;

and lever means pivoted on the frame and acting between the upper shoe and the lower shoe, said lever being C-shaped and including an upper arm bearing on the upper shoe and a lower arm supporting the lower shoe so that downward movement of the lower shoe by the tension on the belt pivots the lever and forces the upper shoe downwardly toward the lower shoe, said upper arm being longer than the lower arm so that the pivoting movement of the lever causes the rate of downward movement of the upper shoe to be greater than the downward rate of movement of the lower shoe so that the upper shoe overtakes the lower shoe and clamps the belt between the shoes and against sliding movement through the frame.

5. The device of claim 4 further characterized by spring means acting on at least one of the levers, the upper shoe, or the lower shoe, to normally establish the upper and lower shoes in spaced apart relation permitting the belt to slide therethrough and yielding to permit the upper shoe to overtake the lower shoe and clamp the belt.

* * * * *